United States Patent Office 2,938,015
Patented May 24, 1960

2,938,015
PRODUCTION OF POLYMERIC GLYCOL TEREPH- THALATES OF IMPROVED COLOR

William T. Gormley, Pittsburgh, Pa., assignor to E. I. du Pont de Nemours and Company, Wilmington, Del., a corporation of Delaware No Drawing. Filed June 21, 1956, Ser. No. 592,731

9 Claims. (Cl. 260—75)

This invention relates to an improved method for the preparation of polymeric glycol terephthalates.

The production of fiber- and film-forming polyesters of terephthalic acid and polymethylene glycols containing from 2 to 10 carbon atoms is described in U.S. Patent 2,465,319 to Whinfield and Dickson. These polyesters, and in particular polyethylene terephthalate, have attracted high commercial interest. They are usually prepared by carrying out an ester interchange reaction between the glycol and a lower dialkyl ester of terephthalic acid, following which the resulting bis-($\omega$-hydroxyalkyl) terephthalate is usually not isolated but is polymerized directly at elevated temperature and reduced pressure. A wide variety of catalytic agents have been proposed to accelerate the course of the ester interchange reaction. For the polymerization reaction, as disclosed in U.S. Patent 2,647,885 to Billica, antimony trioxide and its equivalent glycol-soluble antimony compounds are highly preferred catalysts owing to their high catalytic effect and low tendency towards the production of color as compared with other proposed polymerization catalysts. However, it has been desired to retard still further the formation of color in the polyester provided that this could be accomplished without seriously impairing catalytic activity or promoting still other undesirable side reactions, such as the formation of ether linkages, which lower the softening point of the polymer. This applies especially to textile uses, for which colorless or white fibers having a high melting point are greatly desired.

In preparing the glycol terephthalate monomer,

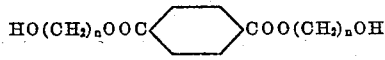
$$HO(CH_2)_nOOC\langle\phantom{xx}\rangle COO(CH_2)_nOH$$

where $n$ is an integer from 2 to 10, the glycol is usually reacted with a lower alkyl ester of terephthalic acid in the presence of a catalyst. Ethylene glycol and dimethyl terephthalate are the usual starting materials in the case of polyethylene terephthalate. Examples of catalytic materials which have been proposed for use in the ester interchange reaction include the alkali metals and their hydrides, all of which dissolve in the glycols, and glycol-soluble compounds of certain metals, such as calcium, zinc, lanthanum, manganese, and cobalt. In some cases the catalyst may be removed from the glycol terephthalate monomer after the ester interchange reaction; for example, a volatile amine may be used as the catalyst and distilled from the reaction mixture after the monomer is formed. However, the usual practice is to allow the ester interchange catalyst to remain since it frequently aids in polymerization to some extent and is usually difficult to remove if not volatile.

The ester interchange catalyst is usually not also a highly active polymerization catalyst, so that it is usually desired to add a specific catalyst for polymerization. Of these the glycol-soluble compounds of antimony, such as antimony trioxide as disclosed in U.S. Patent 2,647,885 to Billica, are highly preferred as effective catalysts which produce polymer having relatively low color. Although the antimony compound has little effect in promoting the ester interchange reaction, it is frequently convenient to add it to the mixture of starting materials together with the ester interchange catalyst.

Although polymer of relatively low color is produced by using antimony compounds as polymerization catalysts, it is desired to reduce still further the color of the polymer, especially when the polymer is intended for preparation of substantially colorless or white textile fibers. Unfortunately, the ester interchange catalyst, which is usually not conveniently removed prior to polymerization if it is non-volatile, generally increases the amount of color which develops during the polymerization reaction, the extent of color formation being dependent on the particular nature of the catalyst. Accordingly, it has been proposed to add to the polymerization mixture other substances, such as phosphorous acid or phosphoric acid, to reduce the amount of color developed in the polymer without seriously reducing the rate of reaction. Unfortunately, the use of such compounds as color inhibitors has been found to be accompanied by still other deleterious effects, such as the development in the polymer of a grayish discoloration and the catalysis of side reactions in the polymerization mixture leading to the formation of excessive ether linkages. Ether linkages are usually present in the polymer only to the extent of about 2–3%, and are undesired in higher concentrations since the softening point of the polyester is thereby seriously lowered. For example, polyethylene terephthalate containing only about 2% ether linkages (calculated as mole percentage of diethylene glycol based on the terephthalate content) has a softening point of about 255° C.; by comparison, polyethylene terephthalate having ether linkages in a concentration of approximately 5% has a softening point of about 247° C. and polyethylene terephthalate containing ether linkages in a concentration of approximately 10% has a softening point of only about 240° C. The resistance of polyesters to degradation by light and the dye light fastness of dyed polyester fabrics is also seriously reduced by the presence of ether linkages in the polymer.

It is therefore an object of this invention to provide a process for producing polymeric glycol terephthalates which are substantially free of color. Another object is the provision of a method which produces substantially colorless linear polyterephthalate esters having a relatively low proportion of ether linkages in the polymer molecule. A still further object is the provision of a method of preparing substantially colorless linear polyesters with a low proportion of ether linkages using a glycol-soluble compound of antimony as a catalyst. Other objects will appear as the description of the invention proceeds.

These and other objects are accomplished in the present invention by polymerizing a compound taken from the class consisting of

$$HO(CH_2)_nOOC\langle\phantom{xx}\rangle COO(CH_2)_nOH$$

and its low condensation polymers, where $n$ is an integer from 2 to 10, by heating the compound under reduced pressure in the presence of a glycol-soluble compound of antimony and an acid phosphate salt of an alkali metal. The polymerization is continued until a filament or film-forming polymer is produced. The joint use of the glycol-soluble compound of antimony as a catalyst and the acid phosphate salt of an alkali metal surprisingly produces a substantially colorless polymer which is relatively free of ether linkages in the polymer molecule. The acid phosphate salts of alkali metals may be represented by the formulas $MH_2PO_4$ and $M_2HPO_4$ where M is an atom of lithium, sodium, potassium, rubidium, or cesium.

The following examples illustrate the principles and practice of this invention and are given for the purpose of illustration only.

EXAMPLE I

The results of a series of experiments on the preparation of polyethylene terephthalate are recorded in Table I. In each case the reaction is carried out in the following manner: 50 parts of dimethyl terephthalate (DMT) and 50 parts of ethylene glycol are placed in a flask together with 0.0225 part of manganous acetate · 2.5 $H_2O$ (0.040 mol percent based on DMT) and 0.015 part of antimony trioxide (0.020 mol percent based on DMT). The flask is fitted with a condenser and heated at atmospheric pressure, whereupon the mixture begins to evolve methanol at about 170° C. Heating is continued at such a rate that continuous gentle ebullition is maintained until no further methanol is evolved, the final pot temperature being about 220° C. in each case. The liquid is then introduced into a polymerization tube together with the indicated amount of additive, and the mixture is heated at 275° C. under a vacuum of 0.5 to 1.0 mm. of mercury for three hours. A continuous stream of nitrogen is introduced through a capillary tube to agitate the mixture.

The intrinsic viscosity of the resulting polymer, a measure of the degree of polymerization, is determined in dilute solutions of the polymer in Fomal, which comprises 58.8 parts by weight of phenol and 41.2 parts by weight of trichlorophenol.

The color of the polymer is determined by dissolving 2.15 grams of the polymer in 20 ml. of Fomal solution, centrifuging the solution for 45 miuntes at 50,000×G to remove any suspended particles, and measuring the optical density of the resulting solution at the wave length of 400 millimicrons with the aid of a spectrophotometer (1 square centimeter Pyrex cell), using a standard cell containing pure Fomal solution as a control. The optical density multiplied by 100 is taken as a measure of the color of the polymer. This system of color determination has been found to give a useful measure of the yellowish to brown range of colors generally encountered in the preparation of polyethylene terephthalate.

The ether content of the polyesters is reported as the mol percentage of diethylene glycol based on the terephthalate content of the polymers.

As shown in the table, polymer produced in the presence of sodium dihydrogen phosphate (entry 2) and sodium monohydrogen phosphate (entry 3) have much better color than polymer produced in the absence of such additives (entry 1). The corresponding salts of the other alkali metals yield similar results. The intrinsic viscosities and ether contents of these polymers are comparable.

Table I.—*Polycondensation of bis-(2-hydroxyethyl) terephthalate*

[Manganous acetate—antimony trioxide catalyst]

| Additive | Conc. (mol percent based on DMT) | Intr. vis. | Color | Ether content |
| --- | --- | --- | --- | --- |
| (1) None | | 0.54 | 18.0 | 2.1 |
| (2) Sodium dihydrogen phosphate | 0.060 | 0.55 | 7.3 | 3.0 |
| (3) Sodium hydrogen phosphate | 0.060 | 0.62 | 7.7 | 2.2 |
| (4) Trisodium phosphate | 0.060 | 0.49 | 17.8 | 4.2 |
| (5) Trisodium phosphate | 0.060 | 0.55 | 6.4 | 3.0 |
| Terephthalic acid | 0.200 | | | |
| (6) Phosphoric acid | 0.060 | 0.63 | 6.1 | 14.9 |
| (7) Phosphorous acid | 0.060 | 0.53 | [1] 6.0 | 2.9 |

[1] Gray.

Phosphate salts in which all of the hydrogen atoms have been replaced by alkali metal atoms (tertiary phosphates) are not effective in reducing polymer color, as illustrated by entry 4 in the table. However, such tertiary phosphates may be used providing that a quantity of phosphoric acid or other acid is simultaneously added so that, in effect, a monohydrogen or dihydrogen phosphate salt is generated in the reaction mixture. No more than about 2 equivalents of acid per mol of tertiary phosphate should be added unless the acid has a smaller dissociation constant than phosphoric acid, in which case a larger quantity may be used, if desired. Entry 5 in the table illustrates the effective use of a tertiary phosphate salt to reduce polymer color where 6.6 equivalents of terephthalic acid (a weaker acid than phosphoric acid) are added per mol of phosphate salt.

Entry 6 in the table illustrates the results obtained by polymerizing in the presence of phosphoric acid, a previously proposed color inhibitor. As shown in the table, polymer of relatively low color is achieved with the aid of phosphoric acid; however, the polymer is also found to contain a very high percentage of ether linkages. Polyethylene terephthalate containing ether linkages in such a high proportion is unsuitable for many uses, since the ether linkages substantially reduce the softening point of the polymer and also affect the properties of the polymer in other ways, as previously described. By contrast, polymer prepared with the alkali metal monohydrogen and dihydrogen phosphates of the present invention have a low ether content as well as low color.

Entry 7 in the table illustrates the results obtained by polymerizing in the presence of phosphorous acid, another previously proposed color inhibitor. Although polymer produced in the presence of this additive has a color of nominally low value on the color scale previously described, the polymer also has an undesirable grayish cast which is apparently caused by small particles of metallic antimony. In the procedure for determining color these particles are removed during the step of centrifuging, so that the apparent color of the polymer as shown by this test does not take into account this grayish cast. Although phosphite salts and other phosphites also produce this undesirable grayish cast in the polymer, polymer produced in the presence of the acid phosphate salts of alkali metals are entirely free of this grayish cast.

The following example illustrates the utility of the acid phosphate salt color inhibitors of this invention when antimony oxide is present as the sole catalyst during polymerization. In this experiment bis-(2-hydroxyethyl) terephthalate is prepared with the aid of a volatile ester interchange catalyst which is distilled out prior to polymerization to provide a catalyst-free monomer.

EXAMPLE II

Fifty parts of dimethyl terephthalate and 50 parts of ethylene glycol are placed in a flask together with 0.80 part of N,N-diethylcyclohexylamine (2.0 mol percent based on DMT). The flask is fitted with a condenser and heated at atmospheric pressure, whereupon the mixture begins to evolve methanol at 136° C. Heating is continued at such a rate that continuous gentle ebullition is maintained for 1.5 hours, during which the theoretical quantity of 16.4 parts of methanol is collected. The mixture is then held under a pressure of 50 mm. of mercury for 25 minutes while the temperature is increased to 232° C., following which the pressure is reduced to 1.0 mm. of mercury while the temperature is held at 232° C. during an additional 30 minutes. During this period part of the glycol distils over together with the N,N-diethylcyclohexylamine ester interchange catalyst. To the catalyst-free monomeric mixture is added 0.015 part of antimony trioxide (0.020 mol percent, based on DMT), and the mixture is then polymerized at 275° C. and 1.0 mm. of mercury for 5 hours. The resulting polymer has an intrinsic viscosity of 0.71 and a yellowish color corresponding to approximately 16 units on the color scale previously described.

The experiment is repeated, except that 0.028 part of potassium dihydrogen phosphate (0.080 mol percent based on DMT; 4 mols per mol of antimony trioxide)

is added to the polymerization mixture together with the antimony trioxide. The mixture is polymerized for 6 hours at 275° C. and 1.0 mm. of mercury. The resulting polymer has an intrinsic viscosity of 0.66 and a pale yellowish color corresponding to approximately 9 units on the color scale previously described, the color being much lighter than the color of the polymer produced without using potassium dihydrogen phosphate. Polymers having similar light colors are produced by substituting lithium hydrogen phosphate and sodium dihydrogen phosphate for potassium dihydrogen phosphate in the above example.

The following example illustrates the utility of the additives of the present invention in preparing polyethylene terephthalate of low color on a large scale.

EXAMPLE III

The following ingredients are introduced into a stainless steel batch still equipped with a stirrer and a condenser:

| | Pounds |
|---|---|
| Dimethyl terephthalate | 10 |
| Ethylene glycol | 6.75 |
| Manganous acetate tetrahydrate | 0.0045 |
| Antimony trioxide | 0.003 |

The ester interchange reaction commences at about 160° C. and is continued until no further methanol is evolved. The resulting material, principally bis-(2-hydroxyethyl) terephthalate, is transferred to a stainless steel autoclave equipped with a stainless steel stirrer. Lithium dihydrogen phosphate in the amount of 0.0028 lb. is added to the mixture, which is then polymerized at 275° C. and 1 mm. of mercury for 2 hours. The resulting polymer has an intrinsic viscosity of 0.61, a color of 9.2 units on the numerical scale described above, and an ether content of 3.9 mol percent (calculated as mol percent diethylene glycol, based on DMT).

When the above experiment is repeated without adding lithium dihydrogen phosphate to the polymerization mixture, the polymer so obtained has a much deeper color (color value greater than 25 units on the numerical scale described above).

In order to obtain the full effect of the additives of this invention, they should be introduced into the reaction mixture early during the polymerization step, or preferably before polymerization has begun. In some cases it may be desired to prolong the ester interchange reaction so that a low polymer of the bis-(ω-hydroxyalkyl) terephthalate is produced instead of the monomeric compound. In such a case the additive may be introduced into the low polymer, i.e., a polymer having an intrinsic viscosity of less than about 0.1. The function of the acid phosphate salt of the alkali metal is to prevent or retard the development of color; the additive appears to have little or no effect on color which has already appeared in the polymer, so that introduction of the additive should not be delayed until late during polymerization when substantial color has already developed.

Although the modifiers of this invention must be added to the reaction mixture before polymerization has proceeded to any great extent, it is not necessary that they be present during the ester inerchange reaction in order to obtain the desired high quality polymer. In fact, it will generally be desirable to omit the modifier during ester interchange when reaction time is a factor, since the rate of ester interchange may otherwise be retarded.

Any acid phosphate salt of an alkali metal may be employed in accordance with the present invention. Included are lithium dihydrogen phosphate ($LiH_2PO_4$), lithium hydrogen phosphate ($Li_2HPO_4$), sodium dihydrogen phosphate ($NaH_2PO_4$), sodium hydrogen phosphate ($Na_2HPO_4$), and the corresponding potassium ($KH_2PO_4$ and $K_2HPO_4$), cesium ($CsH_2PO_4$ and $Cs_2HPO_4$), and rubidium ($RbH_2PO_4$ and $Rb_2HPO_4$) acid phosphates. In general, the sodium, potassium, and lithium compounds are preferred. The acid phosphate salt may be generated in the reaction mixture, if desired, as for example, by adding a tertiary phosphate salt together with an acid.

The additives are glycol-soluble and non-volatile. Accordingly, they may be added to the reaction mixture in a controlled manner in glycol solution without compensation for loss through volatilization under the conditions of high temperature and low pressure existing in the reaction mixture. Moreover, volatile products which would contaminate the excess glycol removed from the reaction mixture during repurification of the glycol are not introduced. Corrosion problems encountered with steel reaction vessels when more acidic additives are employed are avoided when the modifiers of the present invention are used.

The acid phosphate salts are very effective and only small amounts need be used. Since the additives are introduced to modify certain effects of the catalyst, the amount of acid phosphate salt used will depend to some extent on the amount of catalyst used. Usually it will be desirable to use an amount in the range of about 0.05 to about 2.0 mols of acid phosphate salt for each mol of catalyst, based on the total number of mols of all catalysts if more than one catalyst is used. If less than 0.05 mol per mol of catalyst is used, the effect is very small. On the other hand, although amounts in excess of 2 mols may be used if desired, little additional advantage will be gained.

Although the process and advantages of the present invention have been particularly described with respect to the polymerization of bis-(2-hydroxyethyl) terephthalate, it should be understood that the invention is applicable to the polymerization of any bis-(ω-hydroxyalkyl) terephthalate derived from a polymethylene glycol having from 2 to 10 carbon atoms, as well as to low polymers of such glycol terephthalates. The invention extends to the preparation of modified terephthalate polyesters, i.e., modified with small quantities, e.g., up to 20% of other dicarboxylic acids. Examples of such other dicarboxylic acids are isophthalic acid, bibenzoic acid, hexahydroterephthalic acid, adipic acid, sebacic acid, azelaic acid, the naphthalic acids, 2,5-dimethylterephthalic acid, and bis-p-carboxyphenoxyethane. The invention also extends to the preparation of terephthalate polyesters in which up to about 20% of glycols other than the polymethylene glycols are used; for example, up to about 20 wt. percent of a polyethylene glycol may be employed.

It will be apparent that many widely different embodiments of this invention may be made without departing from the spirit and scope thereof, and therefore it is not intended to be limited except as indicated in the appended claims.

I claim:

1. The process of preparing substantially colorless linear terephthalate polymers which comprises reacting dimethyl terephthalate and ethylene glycol in the presence of an ester interchange catalyst, heating the mixture, removing methanol from the reaction zone until no further methanol is evolved and thereafter polymerizing the ester formed by ester interchange to a linear fiber-forming polymer in the presence of a catalytic amount of a glycol-soluble antimony catalyst and at least about 0.05 mol per mol of catalyst of an acid phosphate of an alkali metal, which has been added to the reaction mass before the glycol terephthalate ester has polymerized to an intrinsic viscosity of 0.1.

2. The process of preparing substantially colorless linear polymeric glycol terephthalate esters which comprises polymerizing at elevated temperatures and under reduced pressure a glycol terephthalate in the presence of a catalytic amount of a glycol soluble antimony catalyst, adding thereto before the glycol terephthalate ester has polymerized to an intrinsic viscosity of 0.1 at least about 0.05 mol of an acid phosphate salt of an alkali metal for each mol of catalyst present, and continuing the polymerization until a linear fiber-forming polymeric glycol terephthalate ester is obtained.

3. The process of claim 2 in which an ester is polymerized having the formula

where $n$ is an integer of from 2 to 10.

4. The process of claim 2 in which the phosphate is $NaH_2PO_4$.

5. The process of claim 2 in which the said phosphate is $KH_2PO_4$.

6. The process of claim 2 in which the phosphate is added to a low polymer of bis-($\omega$-hydroxyalkyl) terephthalate.

7. The process of claim 2 in which the catalyst is antimony trioxide.

8. The process of claim 2 in which the phosphate salt is present in the amount of between 0.05 and 2.0 mols for each mol of catalyst.

9. The process of claim 1 in which the phosphate salt is present in the amount of between 0.05 and 2.0 mols for each mol of catalyst.

References Cited in the file of this patent
UNITED STATES PATENTS

| | | |
|---|---|---|
| 2,249,950 | Fuller | July 22, 1941 |
| 2,437,046 | Rothrock et al. | Mar. 2, 1948 |
| 2,650,213 | Hofrichter | Aug. 25, 1953 |